(No Model.) 2 Sheets—Sheet 2.
R. M. HUNTER.
CONDUIT ELECTRIC RAILWAY.
No. 524,025. Patented Aug. 7, 1894.
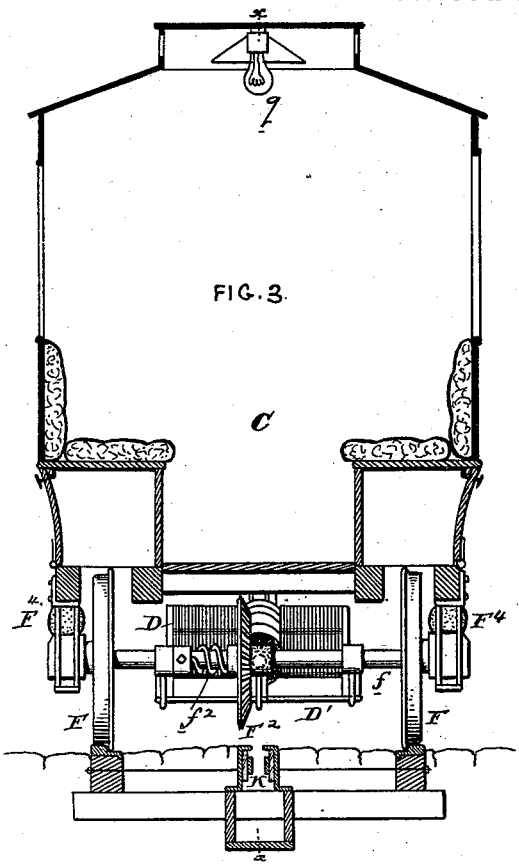
FIG. 3.
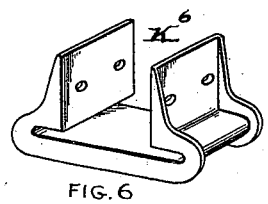
FIG. 6
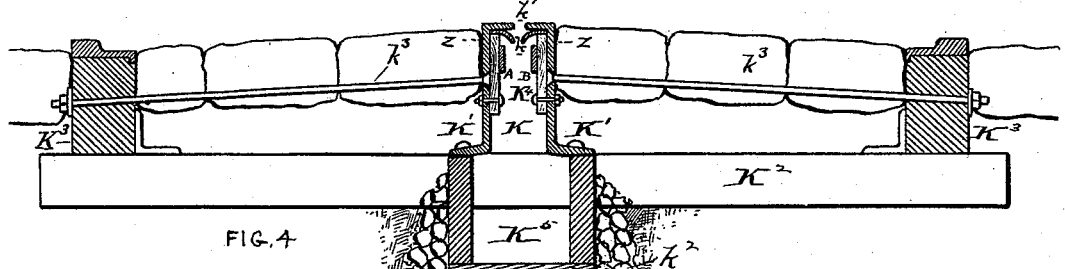
FIG. 4
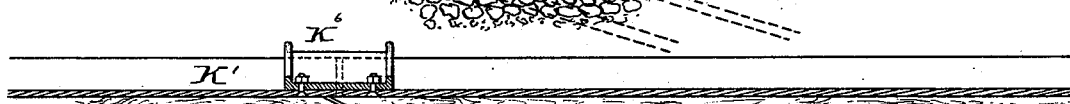
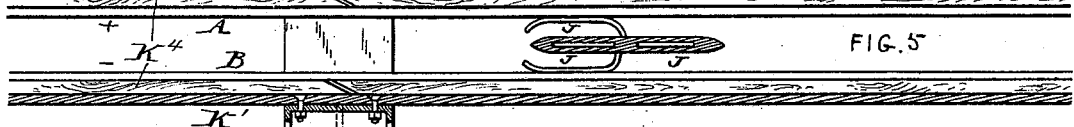
FIG. 5
FIG. 7
Witnesses: Inventor:

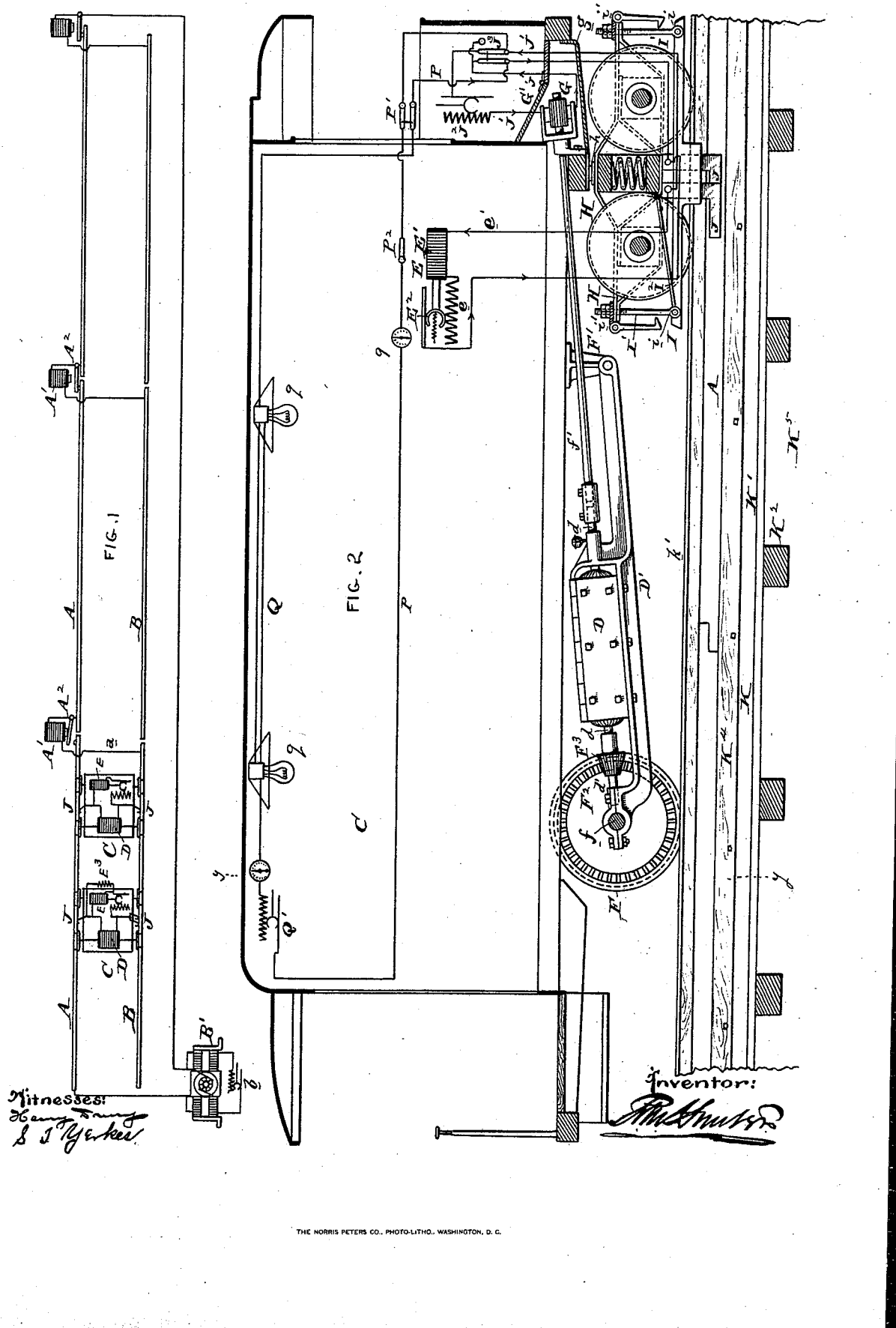

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

CONDUIT ELECTRIC RAILWAY.

SPECIFICATION forming part of Letters Patent No. 524,025, dated August 7, 1894.

Original application filed November 30, 1886, Serial No. 220,240. Divided and this application filed September 12, 1891. Serial No. 405,464. (No model.)

*To all whom it may concern:*

Be it known that I, RUDOLPH M. HUNTER, of the city and county of Philadelphia, State of Pennsylvania, have invented an Improvement in Electric Railways, of which the following is a specification.

My invention has reference to electric railways; and consists of certain improvements fully set forth in the following specification and shown in the accompanying drawings which form part thereof.

This application, Case No. 205, is a division of my application, Serial No. 220,240, filed November 30, 1886.

My invention comprehends certain improvements in the car construction with especial reference to the running gear and motor connections; and also to the collector for conveying current from the conductors along the railway to the motor circuit on the car.

The car shown in this application is especially designed for city railways where sharp curves are necessary. Specifically considered, it consists of a long body under the forward end of which is pivoted a four wheeled truck from which may be suspended the current collectors which project down into the slotted conduit when the latter is used. Under the rear portion of the body is located a pair of wheels similar to those found upon ordinary cars. From this construction it is evident that the car, no matter how long, may readily pass around the sharpest curves.

The electric motor may be connected to the rear axle or its wheels which receive the greatest weight and therefore are capable of producing the greatest traction; or the motors may be arranged on the truck in the manner set out in my Patent No. 441,565, dated November 25, 1890.

The conduit for the working conductors is made with an upper or conductor compartment having the slot at the top, and a lower or drainage compartment such as set out in my applications, filed July 19, 1886, Serial No. 208,418, and September 23, 1886, Serial No. 214,309, the specific construction herein set out being different and much cheaper.

The collector is made with a depending frame which slides along through the slot and is provided at the bottom with the collecting brushes which collect the positive and negative current. These brushes are made to press upon the opposite conductors in the same transverse line so that their combined actions tend to keep the collector frame in the center of the slot and prevents undue binding by torsional action, or excessive wear. This construction also has the effect of insuring a more perfect contact, equalizing both contacts.

The foregoing give the main features of the construction involved. The specific constructions or details are fully set out hereinafter.

In the drawings:—Figure 1 is a diagram illustrating an electric railway employing line conductors. Fig. 2 is a sectional elevation of the car and road bed on line $x\ x$ of Fig. 3. Fig. 3 is a cross sectional elevation on line $y\ y$ of Fig. 2. Fig. 4 is an enlarged sectional view of the road bed shown in Fig. 3. Fig. 5 is a sectional plan view on line $z\ z$ of Fig. 4 showing the conduit and collectors. Fig. 6 is a perspective view of one of the castings for uniting sections of conduit; and Fig. 7 is a perspective view of the collectors.

A and B are two lines of working conductors, and are made in sections. The conductors may be either the rails or auxiliary conductors, suspended, exposed on the surface of the road bed, or placed in a slotted conduit. One end of the conductor A is connected with one terminal of the generator B', and the opposite end of the corresponding section of conductor B is connected by wire $a$ with the adjacent end of the next section of conductor A, and so on. In this conductor A are located magnets A' which operate switches A², so that when no motors are in circuit with a section B the switch A' will operate to close the break between two succeeding sections A, and vice versa. The distant end of the conductor A is connected with the other terminal of the generator B'.

The generator B' may be supplied with the regulator $b$ or other suitable regulating device, and is shunt or compound wound so as to be self regulating and give a varying current in ampères while maintaining a substantially constant potential.

C are electrically propelled vehicles, cars, or locomotives and may be constructed in any manner desired. These cars maintain electrical connection with the conductors A B by suitable current collectors J. D are the electric motors on said cars, and J' is the motor circuit which may have a resistance changer $J^2$ under the control of the operator to vary the speed or power of the motor or stop the car, and a current reversing switch $J^3$ for reversing the current passing to the motor.

E is a shunting device for shunting more or less of the line current around the motors on each car. It consists of a shunt circuit $e'$ in multiple arc connection with the motor D and having a variable resistance $e$ more or less of which is put into or out of circuit by a switch $E^2$ operated by an electro helix and core $E'$, which helix is in the shunt circuit and directly controlled by the current therein. To reduce the amount of current passing through the helix an additional shunt $E^3$ (see Fig. 1) might be placed in the shunt $e$ around the helix. It is immaterial to my invention how this regulator is made so long as it accomplishes the objects sought to be covered.

It will now be understood that if a section of conductors be supposed to hold in multiple arc connection, five cars, one-fifth of all the current will pass through each motor or car. If now two cars are, from any cause, taken off the section, the remaining three cars will still only receive three-fifths of the entire current, as their shunting devices E respond to shunt two-fifths of the current around the motors on the cars, hence the total resistance to the line is constant and the current passing down the line is in no wise diminished. This regulation is automatic, but it is evident that the result might be accomplished by operating the shunting devices by hand.

This description has been given with particular reference to a system employing series and multiple arc connection of cars combined, but it is also evident that it is applicable where the entire line is operated on the multiple arc system, (which corresponds to one section of the above described system) as the regulator shunt device would operate to increase or reduce the current flowing through the motor to compensate for the change in the resistance of the line according as the motor is near to or very far from the generation station.

It is my object to use comparatively high tension currents and working conductors of small sectional area. In long lines and where a large number of cars are on circuit this line resistance is an important factor in automatic regulation.

The car shown in Fig. 2 is well adapted to city railways, and consists of the long body supported at its forward end upon a four wheeled truck H by a pivot $h$. The truck has a small wheel base and hence can turn sharp curves, and may be made in any well known manner, having suitable springs. The rear end of the car body is supported on two wheels F secured to their axle $f$ which is journaled in boxes in the usual way and support the car body through springs $F^4$ (see Figs. 2 and 3). By this construction of supporting wheels the car is maintained from jumping or swinging up and down as is now so frequently seen on horse and cable railways. In those systems it is not so objectionable, but in an electric railway the wheel base should under no circumstances be subjected to jar owing to the necessity of using the current collectors. By placing the four wheeled truck forward, a rapid travel can be maintained without the least tendency of jumping the track at quick curves.

D is the electric motor and is supported on the frame D' journaled or hinged upon the rear axle $f$, and at its forward end is connected at F' to the car body between the forward truck and axle $f$. By this means the car body may rise and fall on its springs without changing the distance between the motor and axle $f$. The motor shaft $d$ is supported in the journal $d'$ close to the axle $f$ and is provided with the bevel pinion $F^3$ adapted to mesh with the wheel $F^2$ secured to the axle $f$. This elastic connection allows the motor to start up more easily and overcome the inertia of the car at rest.

I do not limit myself to any particular connection between the motor shaft and car axle as there are a large number of mechanical connections or power transmitters which might be used. The motor proper is located close to the rear axle $f$ and increases the traction, while the commutator G of the motor is brought forward to the front platform $G^2$. As shown, the commutator is located immediately below the front platform and may be inspected or adjusted by a door G', and protected below from dust and dirt by a case or covering $g$. By this construction I am enabled to locate the weight of the motor where it is best needed, and the commutator where it can be inspected and adjusted. The body of the motor would not require protection as the journals may be especially designed to keep out dirt. The shaft $f'$ should be strong enough to resist torsional action so as to maintain proper connection between the commutator and its brushes with reference to the position of the armature coils in the field, but may be slightly flexible otherwise.

It is evident that the motor may be either a shunt or series wound machine, and the field magnets may revolve as set out in my Patent No. 434,147, dated August 12, 1890, in place of the armature rotating.

The collectors J are carried by the pivoted truck through the mediation of a collector frame I hung by bolts I' from the truck frame H'. These bolts have screws and nuts $i'$ by which the height of the frame I may be adjusted to bring the collectors J in line with the conductors. These bolts I' are hinged to the frame I at $i$, and this frame is also connected to the truck frame by a link or drag bar I². This construction will allow all the lateral play required to follow inequalities in a slotted conduit or conductors and in passing around curves.

The collector frame has the lower central portion made to project down through the slot of a conduit and the collectors are made flat and pass up through the same, being insulated from it. These collectors are arranged one in front of the other to take up as little space in width as possible but at their points of contact with the conductors A and B are in the same transverse line so as not to produce twisting, binding, or excessive torsional action of the collector frame. These collectors are in the center of the truck wheel base where but a small amount of lateral play will be required. By putting the collectors on the truck they may follow the curves more readily and irrespective of the position of the car body.

The collector frame is supported by the truck frame H' directly upon the axles, and is not affected by the vertical or lateral movements of the motor or car body, as such movements are taken up by the springs interposed under the bolster of the truck upon which the car body or motor supporting frame is pivoted at $h$.

The position of the rear or drive wheels is in front of the rear platform and in such a position that the maximum traction will be produced with a full load. It is a well known fact that in a crowded car the rear wheels receive by far the greatest load, and in this car the effect is still further increased by locating the forward wheels up under the extreme front of the car body, so that every passenger in the car puts an increase of traction on the rear wheels.

K² are the cross ties of the road bed and support the stringers or rails K³ in the usual manner. Secured to the ties are two angle beams K' which face in opposite directions and have overhanging flanges which form the slot $k'$ and foot flanges adapted to be secured directly to the cross ties. These metal beams or walls form the upper or conductor conduit K, and are kept from closing together by tie rods $k^3$ connecting with the rails or their stringers. The ends of these beams are received upon the inside of a cast iron shoe K⁶ having under cut portions to receive the foot flanges and to which they are bolted by bolts with allowance for expansion and contraction (Figs. 5 and 6). The height of these beams is a little greater than the distance of the rails above the ties so as to bring the slot at a higher level than the rails to keep out dirt and water. Upon the inner walls of these beams are secured insulating timbers K⁴ preferably of hard wood with paraffin or equivalent water proofing substance, and upon these walls are secured the conductors A B which are preferably located near the upper part to leave considerable depth below and protect them from dripping water, &c.

To prevent water, dirt, or slush entering the slot from getting upon the conductors, I provide overhanging flanges $k$ of sheet metal which are so shaped that any water, &c., entering the conduit slot shall be directed toward the middle and will fall to the bottom without touching the conductors.

Located below the conductor conduit K and opening into it is a drainage conduit K⁵ which may be of metal, cement, brick, stone, or wood. It is located below the ties, is preferably wider than conduit K, and has its walls extended up between ties to meet the outer edges of the flanges of the beams K' as shown in Fig. 4. When made of wood this conduit would have a foundation of open stone $k^2$ to allow of free drainage of water. The conduit K⁵ may connect with the sewer as often as desired to carry off surface or collected water, and at intervals this conduit may be cleaned by flushing it out with water, which may be let in at one or more places according to connections with the sewers. A conduit of this construction is cheap and durable, and guards against leakage of current, and can be readily cleansed.

I have described the general features of my improvements, but it is to be understood that I do not limit myself to the details, as they may be modified in various ways without departing from my invention.

Having now described my invention, what I claim as new, and desire to secure by Letters Patent, is—

1. In an electric railway, the combination of a working conductor arranged along the railway, an electrically propelled vehicle, an electric motor for said vehicle connecting with power or drive wheels, and an independent truck propelled by said vehicle having a collector making contact with the conductor.

2. In an electric railway, the combination of a working conductor arranged along the railway, an electrically propelled vehicle having a pivoted truck, and a collector suspended from said truck substantially below its pivoted point and making contact with the conductor.

3. In an electric railway, the combination of a working conductor arranged along the railway, an electrically propelled vehicle having a pivoted truck, and a laterally adjustable collector suspended from said truck substantially below its pivoted point and making contact with the conductor.

4. In an electric railway, the combination of a working conductor arranged along the railway, a slotted conduit containing said conductor, an electrically propelled vehicle having a pivoted truck, and a laterally movable collector suspended from said truck substantially below its pivotal point projecting into the conduit and making contact with the conductor.

5. In an electric railway, the combination of a working conductor arranged along the railway, an electrically propelled vehicle having two sets of supporting wheels, an electric motor connecting with one set, and a current collector carried by the other set and making contact with the conductor.

6. In an electric railway, the combination of a working conductor arranged along the railway, an electrically propelled vehicle having a pivoted four wheeled truck, and a current collector carried by said truck between its wheel base making contact with said working conductor.

7. In an electric railway, the combination of the cross ties, the conductor conduit formed above the said ties and consisting of flanged metal beams secured directly to the cross ties, an electric conductor in said conduit, and a drainage conduit formed below said ties and of greater width than the conductor conduit.

8. In an electric railway, the combination of a working conductor extending along the railway, an electrically propelled vehicle, a motor hinged to the axle of the vehicle and mechanically connected to rotate it, a collector frame supported by the vehicle independently of the motor and making contact with the working conductor, whereby it is not affected by vertical or lateral movements of the motor, an electric circuit leading from the collector to the motor, and a return circuit leading from the motor back to the source of power.

9. In an electric railway, the combination of a working conductor extending along the railway, an electrically propelled vehicle, a motor hinged to the axle of the vehicle and mechanically connected to rotate it, a collector frame supported by the vehicle independently of the motor and making contact with the working conductor, whereby it is not affected by vertical or lateral movements of the motor, an electric circuit leading from the collector to the motor, means to control the motor arranged on the car, and a return circuit from the motor to the source of electric supply.

10. In an electric railway, the combination of a working conductor extending along the railway, an electrically propelled vehicle, a motor hinged to the axle of the vehicle and mechanically connected to rotate it, a collector frame supported by the vehicle independently of the motor and making electrical contact with the working conductor, whereby it is not affected by vertical or lateral movements of the motor, adjustable supporting devices for the collector as a whole to permit lateral but not longitudinal motion thereto, a motor circuit between the collector and motor, and a return circuit from the motor to the source of electric supply.

11. In an electric railway, the combination of the rails, a conduit consisting of two longitudinally arranged flanged beams forming a slot and a conduit between them, and having outwardly extending foot flanges or ribs at the bottom, an electric conductor insulated from said beams and arranged between them, and U shaped castings arranged at intervals and bolted to and supported by the said longitudinal beams so as to hold them relatively in position and having recesses to receive the outwardly extending foot flanges of the beams.

12. In an electric railway, the combination of the cross ties and rails, with a conduit formed of two metal walls having overhanging flanges which form the slot, insulating supports secured to said metal side walls, conductors connected to said insulating supports, and sheet metal drainage flanges overhanging the conductors and secured upon the interior of the conduit and under the slot to prevent water running down upon the conductors.

13. In an electric railway, the combination of the cross ties, the conductor conduit formed above the said ties, an electric conductor in said conduit, a drainage conduit formed below said ties, and sheet metal drainage flanges overhanging the conductors and secured upon the interior of the conduit and under the slot to prevent water running down upon the conductors.

14. In an electric railway, the combination of the cross ties, the conductor conduit formed above the said ties, and electric conductor in said conduit, a drainage conduit formed below said ties, the two conduits opening freely into each other, and sheet metal drainage flanges overhanging the conductors and secured upon the interior of the conduit and under the slot to prevent water running down upon the conductors.

15. The combination of the cross ties $K^2$ and rails, the metal beams $K'$ supported upon the cross ties and forming the slot $k'$, the insulating walls $K^4$ secured to the upper parts of the beams $K'$, and conductors A B secured upon said insulation and near the upper part of the conduit.

16. The combination of the cross ties $K^2$ and rails, the metal beams $K'$ supported upon the cross ties and forming the slot $k'$, the insulating walls $K^4$ secured to the upper parts of the beams $K'$, conductors A B secured upon said insulation near the upper part of the conduit, and the drainage flanges $k$, substantially as and for the purpose specified.

17. The combination of the cross ties $K^2$ and rails, the metal beams K supported upon the cross ties and forming the slot $k'$, the insulating walls $K^4$ secured to the upper parts of the beams $K'$, and conductors A B secured upon said insulation and near the upper part of the conduit, the depths of the beams $K'$ being greater than the height of the rails above the cross ties to bring the slot upon a higher level than the said rails.

18. In an electric railway conduit, the metal beams having flanged feet forming the walls of the conduit, in combination with castings made substantially U shaped with under cut portions to receive the feet and adapted to couple four sections of beams.

19. In an electric railway conduit, the metal beams having flanged feet forming the walls of the conduit, in combination with castings made substantially U shaped with under cut portions to receive the feet adapted to couple four sections of beams, the said casting fitting upon the outside of the beams, and bolts connecting the beams to the casting.

In testimony of which invention I have hereunto set my hand.

R. M. HUNTER.

Witnesses:
ERNEST HOWARD HUNTER,
S. T. YERKES.